United States Patent [19]
Sciaky et al.

[11] 3,885,123
[45] May 20, 1975

[54] METHOD AND MEANS FOR CONTROLLING ADJACENT ARCS

[75] Inventors: Albert M. Sciaky, Palos Park; Richard W. Reynolds, Hazel Crest, both of Ill.

[73] Assignee: Welding Research, Inc., Chicago, Ill.

[22] Filed: Aug. 20, 1973

[21] Appl. No.: 390,066

[52] U.S. Cl. ............................. 219/123; 219/137
[51] Int. Cl. ............................................ B23k 9/08
[58] Field of Search ................... 219/123, 122, 137

[56] References Cited
UNITED STATES PATENTS
1,854,536   4/1932   Wilson .......................... 219/123
3,641,309   2/1972   Klebel ........................... 219/123

OTHER PUBLICATIONS
R. W. Holt, "Methods of Controlling Arc Blow," The Welding Engineer, April, 1932, pg. 44 "Control of Magnetic Fields in the Arc When Welding," Journal of American Welding Society, April, 1927, pg. 51.

*Primary Examiner*—J. V. Truhe
*Assistant Examiner*—Clifford C. Shaw

[57] ABSTRACT

This invention relates to arc welding apparatus and describes a method and means for producing welds in which the metal in the weld area is of higher ductility than has been produced in welds made with conventional welding apparatus. Two welding torches are utilized one closely following the other. A magnetic field is directed across the arc formed by each torch so as to produce a force which is directed opposite to the force created by currents flowing in the same direction through the adjacent arcs. This latter force would otherwise cause the arcs to move towards each other and be erratic and inconsistent in their effect.

10 Claims, 8 Drawing Figures

METHOD AND MEANS FOR CONTROLLING ADJACENT ARCS

This invention relates to a method and apparatus for arc welding and, more specifically, to a method and means whereby a multiplicity of welding torches may be operated simultaneously in close proximity to one another.

One of the more important industrial welding processes is the high speed automatic gas metal arc welding process. In this process, an electric arc is formed between the end of wire which is being continuously fed to the work area, and the work. The arc melts the wire and a localized area on the work where the arc is struck and the molten metal from the wire and the workpieces coalesce to form the weld between the work pieces, the gap between the work pieces being filled by the filler wire which is being continuously fed to the weld area.

One of the problems in arc welding which appears especially when welding thick parts having a high heat capacity is that the material melted by the arc and which is to form the weld bead is rapidly cooled by the mass of the workpieces. Because of the rapid cooling rate the austenitic crystalline structure in the molen metal is transformed to the ferrite and cementite form and a high percentage of martensite. The martensite structure of the iron, in the first bead especially, is very objectionable inasmuch as it is extremely hard and extremely brittle. In order to avoid the rapid cooling of the first weld bead it is necessary to slow down the cooling rate of the iron and the method in accordance with this invention is to form a second weld bead as close behind the first weld bead as is possible, preferably within a distance of less than two inches. This is done by placing a second torch less than two inches behind the first welding torch and forming the beads in close tandem one behind the other. In this way the cooling rate of the first bead is kept at such a level that undue proportions of the martensitic structure are not formed and a ductile weld results.

When an attempt was made to simultaneously operate a second torch in close proximity to a first torch it was discovered that the arcs failed to maintain themselves in a continuous and uniform manner as they do when operated independently, and that the penetration and deposition of the metal became inconsistent. It was discovered that there was mutual interference between the two arcs and that the two arcs were drawn towards each other resulting in a deformation of the arc and, as a consequence, in an inconsistent deposition of metal and reduction in the penetration of the arc.

The object of the present invention is to overcome the inconsistency in results when two arc welding torches are operated simultaneously and in close proximity to each other.

Another object is to provide for the simultaneous operation of two torches in close proximity to each other and in which each arc formed is coaxial with its welding torch.

Another object is to provide an auxilliary magnetic force which acts upon the arc so that it overcomes the effect of a magnetic field which would otherwise cause the arc to be deflected from its normal course.

Another object of the invention is to provide apparatus for the welding of materials at high speeds.

Another object is to provide apparatus by which weld beads having a high ductility may be obtained.

Other important objects, additional novel features and further advantages of the present invention will become apparent from the appended claims and from the following detailed description and discussion in conjunction with the accompanying drawings in which:

Figures 1, 2:
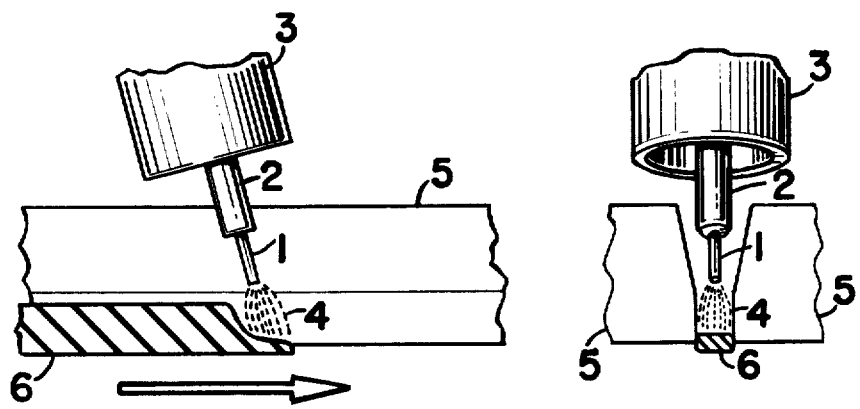
FIG. 1 illustrates the formation of a welding bead at the bottom of a groove formed between two workpieces to be welded together.
FIG. 2 is a partial sectional view of the torch and the work when viewed from the front of the gap.
Figure 3:
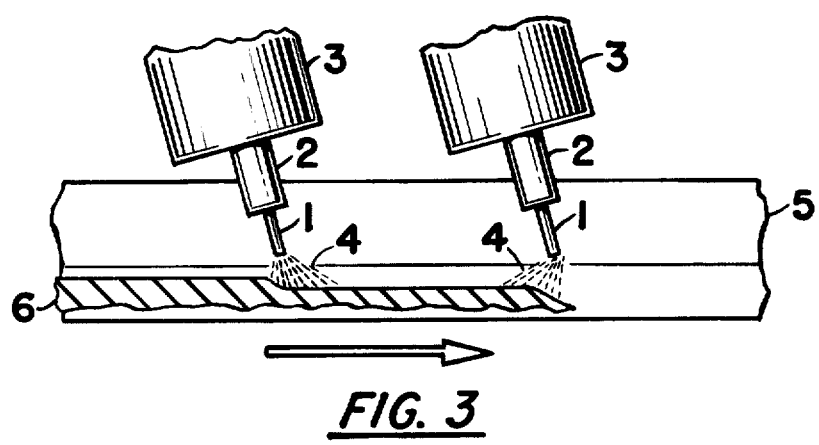
FIG. 3 is a side partial sectional view of two torches in close proximity to one another showing the arcs being deflected by mutual magnetic effects.

Referring now to FIG. 1 which is an illustration in partial section showing a portion of a metal inert gas (MIG) welding torch 3 in position with respect to two plates 5 which are to be welded. In the Mig welding process current from a direct current power source of approximately 30 volts terminal voltage with a capability of supplying several hundred amperes of direct current at 26 to 32 volts is connected from one of its output terminals to the welding torch 3 and from the second of its output terminals to the work to be welded 5. When the welding arc 4 is struck current will flow from one terminal of the power supply to the torch to a contact tube 2 through which the filler wire 1 passes while making good electrical contact with the contact tube 2 across the arc 4 and returning through the work to the second terminal of the welding power supply. The high temperature arc 4 formed between the end of the wire 1 and the workpiece 5 melts the end of the wire and a portion of the walls with which the arc is in contact and the molten metal from the wire mixes with molten metal from the walls of the groove formed by the workpieces to form a weld bead 6. Wire is continuously fed to the area as fast as it is melted away and the work is moved in relation to the welding torch so as to deposit a single bead along the length of the seam to be welded. The first welding pass should produce an underbead which protrudes slightly from the under surface of the parts being welded in order to provide proper reinforcement at this point. Normally if the parts to be welded are not pre-heated the welding bead and the adjacent underbead zone of the base metal 5 formed will be extremely hard and brittle because the molten metal which forms the bead is cooled at a very rapid rate (quenched) by the cold workpieces. In order to provide a welding method by which ductile and relatively soft weld underbeads could be produced without the necessity of preheating the workpieces, a second welding torch was positioned very close behind the first welding torch so as to form a second weld bead directly over the first weld bead at a distance less than two inches from the first torch. When the two torches are operated simultaneously as indicated in FIG. 3, however, it is found that in contrast to the uniform and symmetrical arc formed when one torch is used alone, as illustrated in FIG. 1, the arcs from both torches tend to move toward each other to become distorted and inconsistent in operation and tend to blow out so that the welding action becomes erratic, imperfect and inadequate. It is found that the penetration of the weld bead 6 is less than in the case when only one torch is utilized and a full and uniform underbead with proper reinforcement is not developed. It was discovered that the cause for this erratic operation of the arcs was due to the fact that the magnetic fields formed around each arc interact with one another to create a force which moves both arcs towards each other inasmuch as the currents passing through the wire in each torch and through each arc are flowing in the same direction. It is well known that wires in close proximity to each other which carry currents flowing in the same direction will move towards each other. Since the torches are fixed it is only the ends of the wire and the arcs which move towards each other. This motion causes the erratic operation of the arcs.

Figure 4:
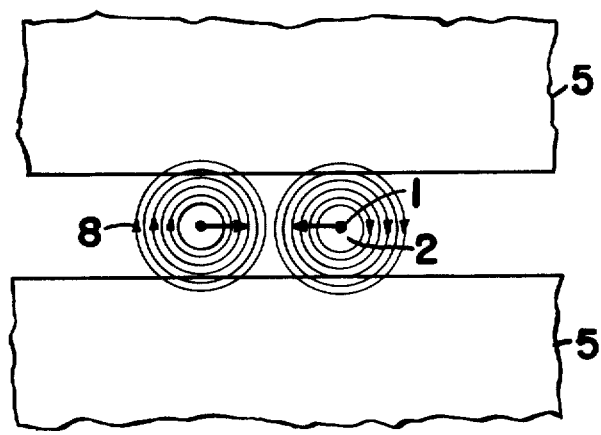
FIG. 4 illustrates the magnetic fields and forces acting upon the filler wire and arc.
Figure 5:
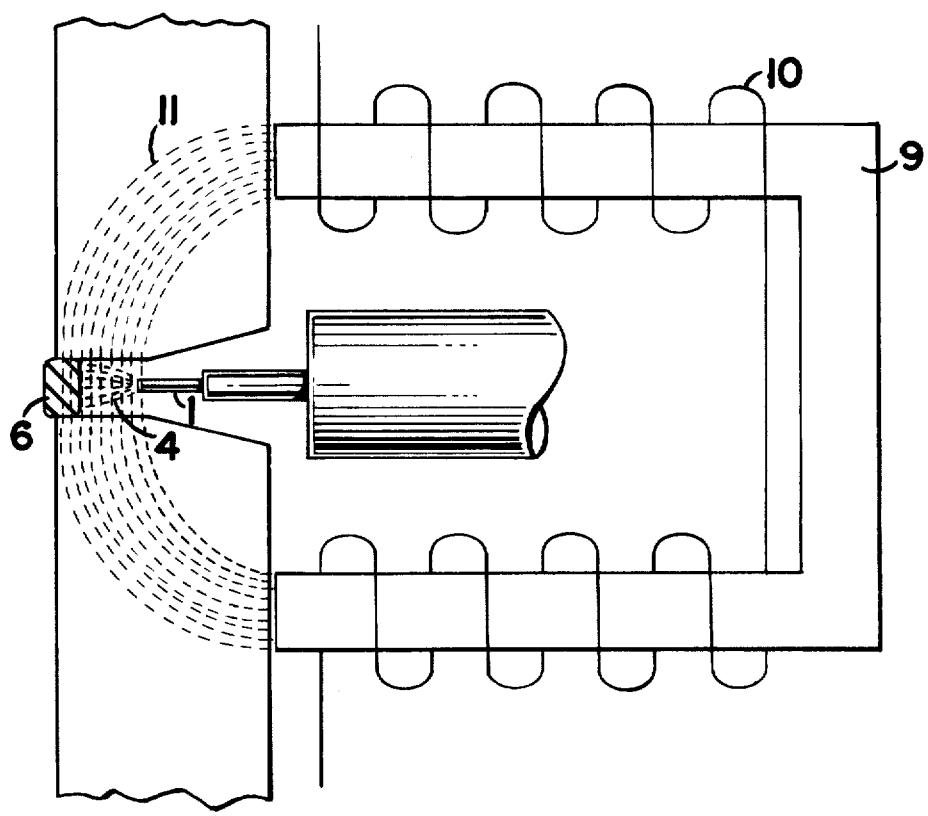
FIG. 5 illustrates the spatial relationship between the arc welding torch and the electro-magnet supplying the correcting field.

FIG. 4 illustrates the fields which form around the wires 1 of two torches operating in proximity to each other. Current flowing downward from above the sheet produces a magnetic field around each wire in the direction shown and these fields react, one with the other, to create a force on each wire and arc which urges them to move towards each other. In order to overcome this force the present invention proposes the use of an external magnetic field applied through the arc area which will act in such a direction in conjunction with the current flowing through the arc so as to counter the effect of the first mentioned force between the two arcs. The apparatus illustrated in FIG. 5 provides the magnetic field. 9 represents an iron core structure about which is wound a coil 10. By passing a direct current in the proper direction through the coil, a magnetic field 11 will be produced which passes across the gap between the two plates being welded. The magnetic field will, of course, be strongest where the gap is shortest. It is well-known that when current is passed through a wire which lies in a magnetic field having components at right angles to the length of the wire that a force will be developed which will move that wire, the force being proportional to the strength of the magnetic field and the intensity of the current flowing through the wire. By adjusting the current flowing through the coil 10 the magnetic field 11 may be obtained which is of such magnitude as to create a force acting upon the arc which is equal and opposite to the force which is exerted upon the arc because of the interaction of the magnetic fields developed by the current passing through the two arcs which are in close proximity.

Figure 6:
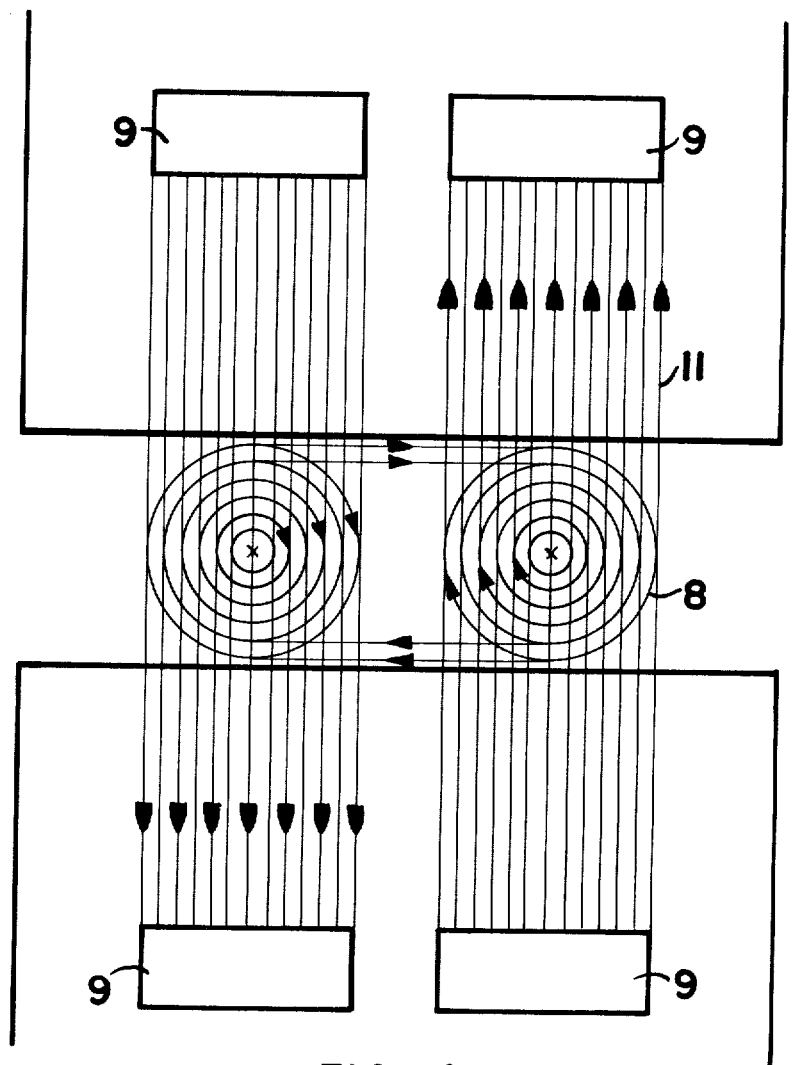
FIG. 6 illustrates schematically the several magnetic fields and forces acting within the welding area.
Figure 7:
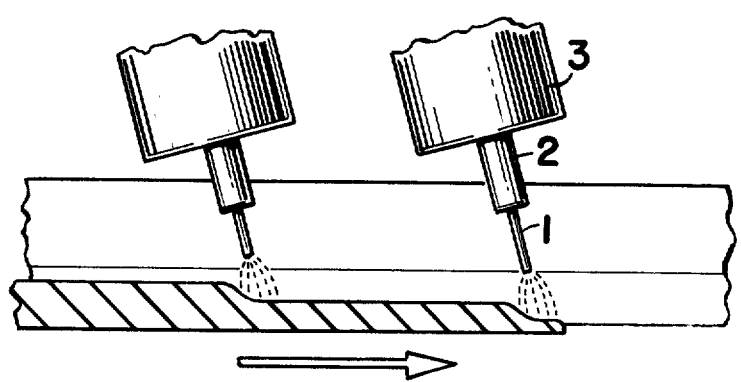
FIG. 7 illustrates in partial sectional view two torches operating in close proximity to each other after the correcting forces have been applied to the arcs.

By the method of this invention two arcs in close proximity may be formed from the ends of the wire being fed into the weld pool from two torches in close proximity to each other, as is illustrated in FIG. 7. There will be no interference of one arc upon the other. The arcs will be stable and because of the reduction in the cooling rate of the metal in the first bead, that underbead will be ductile and of good quality and allow for the high speed production of weldments having good mechanical properties. The torches and the electro-magnets may be supplied from an alternating current source as long as the arc currents and magnetic coil currents are synchronized to produce at one instant during the current flow fields as illustrated in FIG. 6.

Figure 8:
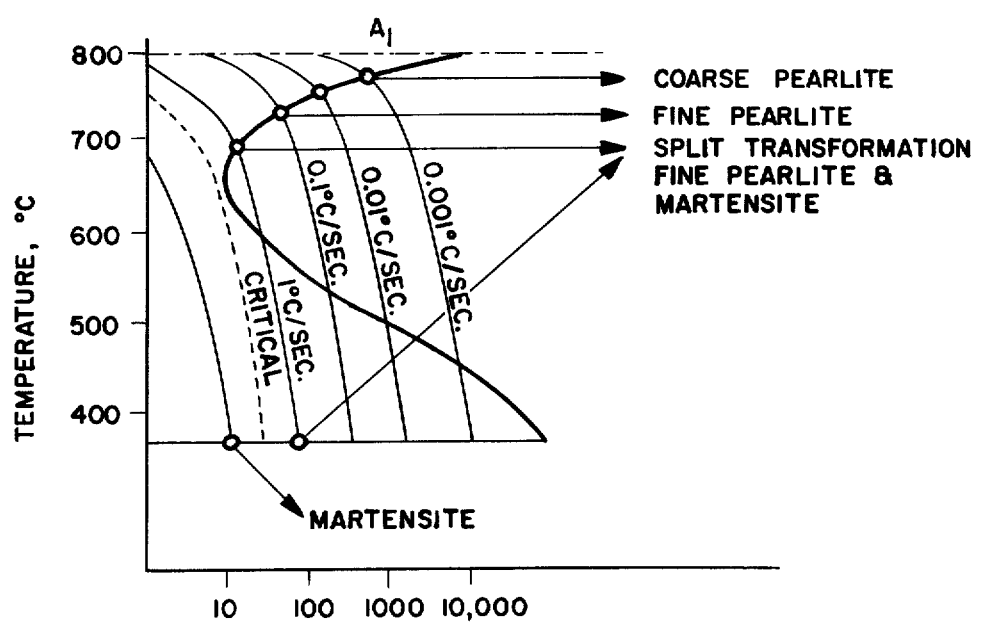
FIG. 8 is a typical isothermal diagram for initiation of austenite-pearlite transformation.

FIG. 8 is a curve commonly called an S or TTT curve which illustrates the typical isothermal transformation of iron alloyed with carbon as its temperature is reduced below the critical range. The heavier line is the S curve and the family of thinner lines drawn from the line $A_1$ representing the critical temperature, each represent a different rate in °C per second of cooling of the iron. The curve shown in dotted form is the critical rate of cooling curve which results in a transformation of the austenitic structure to a martensitic structure. The curves to the right describing successively slower rates of cooling determine the kind of transformation that will occur at each rate of cooling. For the slowest rate at the extreme right the transformation will result in a coarse pearlite structure. The structure will be a finer and finer pearlite as the metal is allowed to cool at faster and faster rates. Finally, at the critical rate and above, only martensite will be formed.

In order to make allowances for differences in transformation characteristics of the various metals and alloys which may require welding, the distance between torches can be varied so as to accomodate the particular transformation characteristics of the metal to be welded. These characteristics are shown by their so-called S or TTT curves which show how long it takes austenite to transform isothermally to various constituents at temperatures below the critical. The critical is defined as that temperature range over which iron changes from alpha iron (ferrite) which has the body centered cubic crystal structure, to the gamma iron (austenite) having a face centered cubic structure on heating or vice versa on cooling. For materials of high hardenability, i.e., those that transform to the martensitic or hard structure at slower cooling rates, or in other words, would require longer quench times in order to remain ductile. The torches are placed closer than for materials which are less hardenable. By an extension of the process three and more torches may be utilized, one following the other in close proximity, so that sound welds may be rapidly produced in thick plates with one pass of a multiplicity of welding torches.

What I claim is:

1. A method of electric arc welding along the line between two adjacent or adjoining work-pieces using two separate arcs in close proximity to one another which are formed between the said workpieces and separate conductive materials supported by or passing through separate welding torches, comprising the steps of causing electric currents to flow through each of the said electrically conductive materials and across the said electric arcs, generating a separate magnetic field in association with each of said arcs, causing the said magnetic fields to flow along paths transverse to the line of weld and across each of the said arcs in such a direction as to create forces which act upon each of said arcs to counteract the magnetic force between the two arcs caused by the current flowing in each of the arcs.

2. A method in accordance with claim 1 in which the said current flow is unidirectional and flows from the said conductive materials to the work.

3. A method in accordance with claim 1 in which the current flows from work to the said conductive materials.

4. A method in accordance with claim 1 in which the said current and magnetic fields are alternating.

5. A method in accordance with claim 1 in which the arcs are less than 3 inches apart.

6. A method as in claim 1 in which the said magnetic field is adjustable in magnitude.

7. A method of electric arc welding as in claim 1 in which the arc is sustained between a filler wire being fed continuously through each torch and the workpieces.

8. A method as in claim 1 for producing ductile welds in which the distance between the said torches is made adjustable so as to allow the welding of a variety of materials having a wide range of hardenability.

9. A method as in claim 2 in which parts to be welded are separated by a narrow gap along a desired line of weld and the arc struck between the walls of the gap and the end of a filler wire being fed continuously through a welding torch.

10. Apparatus for practicing the method of electric arc welding along a line in which two separate electric arcs are sustained in close proximity to one another along the said line, comprising a first arc welding torch, a second arc welding torch in close proximity to the said first torch, electrically conductive material in the form of a welding rod or wire attached to or passing through the said torches, power supply for supplying electric current which can flow through each of said electrically conductive material and said arcs, means for generating separate magnetic fields in association with each of said arcs, and means for causing the said magnetic fields to flow along paths transverse to the said line of weld and across each of said arcs so as to counter the magnetic force between the two arcs caused by the current flowing in each of the arcs.

* * * * *